Figure 1:
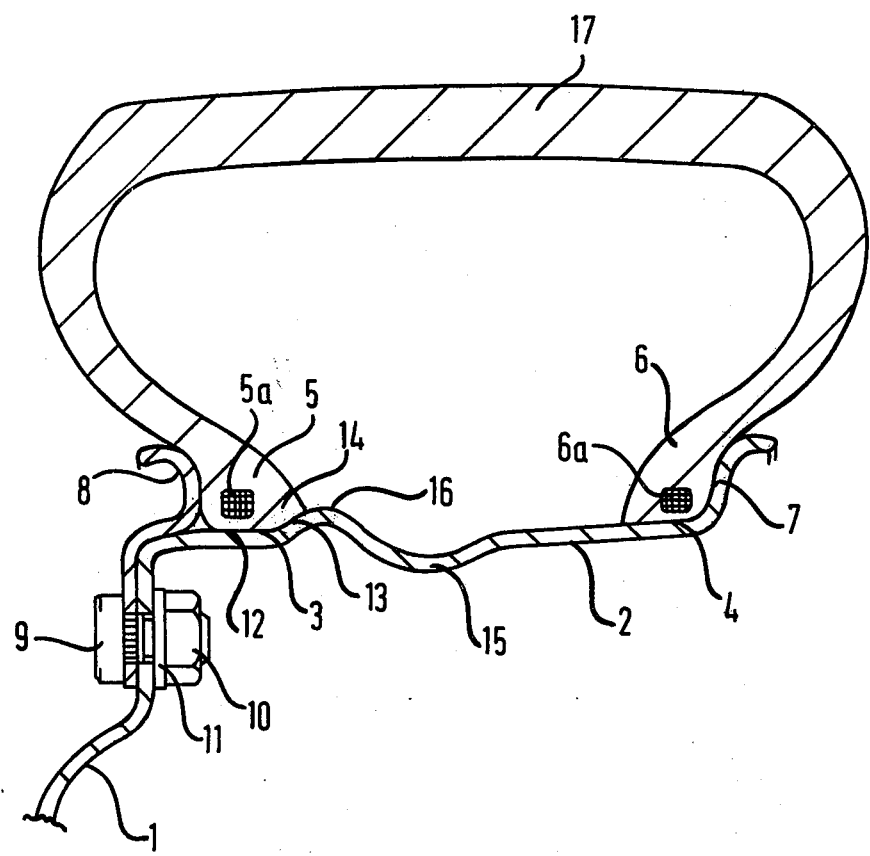

United States Patent [19]

Mitchell

[11] 3,999,588
[45] Dec. 28, 1976

[54] WHEEL RIMS, PNEUMATIC TIRES, AND WHEEL RIM AND PNEUMATIC TIRE ASSEMBLIES

[75] Inventor: William Eric Mitchell, Coventry, England

[73] Assignee: Dunlop Limited, London, England

[22] Filed: Dec. 19, 1974

[21] Appl. No.: 534,471

[52] U.S. Cl. .............. 152/398; 152/330 RF; 152/379 R; 152/405

[51] Int. Cl.² .............. B60B 23/10; B60B 25/22; B60C 15/02

[58] Field of Search ........... 152/330 RF, 396, 397, 152/398, 399, 400, 405, 406, 375, 379, 381, 362 R, DIG. 6

[56] References Cited

UNITED STATES PATENTS

| | | | |
|---|---|---|---|
| 1,939,935 | 12/1933 | Wagenhorst | 152/398 |
| 2,108,329 | 2/1938 | Carter | 152/399 |
| 2,868,258 | 1/1959 | Powers | 152/398 |
| 2,948,568 | 8/1960 | Hykes et al. | 152/406 |
| 3,130,965 | 4/1964 | Niclas | 152/398 |
| 3,229,744 | 1/1966 | Bradley | 152/398 |
| 3,283,800 | 11/1966 | Ischinger et al. | 152/397 |
| 3,758,161 | 9/1973 | Bradley et al. | 152/396 |
| 3,842,882 | 10/1974 | Gough et al. | 152/DIG. 6 |
| 3,865,170 | 2/1975 | Mitchell | 152/399 |

FOREIGN PATENTS OR APPLICATIONS

| | | | |
|---|---|---|---|
| 593,116 | 2/1960 | Canada | 152/DIG. 6 |
| 1,365,373 | 9/1974 | United Kingdom | 152/398 |

*Primary Examiner*—Drayton E. Hoffman
*Attorney, Agent, or Firm*—Stevens, Davis, Miller & Mosher

[57] ABSTRACT

A split rim assembly, the one-half of the rim being furnished with both bead seating portions, one of said bead seating portions extending substantially parallel to the rim axis and merging into a ramp which is engageable by the toe of the bead of an associated tire to seal the tire/rim cavity. The diameters of the bead seating portions may be the same or alternatively the diameter of the outboard bead seating portion may be less than the diameter of the inboard bead seating portion.

9 Claims, 2 Drawing Figures

WHEEL RIMS, PNEUMATIC TIRES, AND WHEEL RIM AND PNEUMATIC TIRE ASSEMBLIES

This application is related to applicant's copending U.S. patent application Ser. No. 260,463, filed June 7, 1972, now U.S. Pat. No. 3,885,615, May 27, 1975.

This invention relates to wheel rims, pneumatic tires, and wheel rim and pneumatic tire assemblies and is an improvement in or modification of the invention described in the specification of our U.S. Pat. No. 1,365,373.

In the specification referred to above, a divided rim construction is described in which the rim comprises a first rim part having a tire bead retaining flange, a radially inwardly extending attachment flange and a bead seating portion positioned therebetween, the first rim part being secured to a second rim part which comprises the other tire bead retaining flange and seating portion, and is formed in the region adjacent the first rim part with a circumferentially extending radially outwardly projecting hump portion arranged to be capable of making an air-tight sealing engagement with the bead of an associated tire seated on the first rim part, the second rim part comprising a well portion of sufficient depth to enable a tire bead to be passed over the hump portion.

According to the present invention, a split rim assembly comprises a first rim part which comprises a bead retention flange and a first attachment flange and a second rim part having a pair of bead seats formed thereon to enable a pneumatic tire to be seated on said second rim part, a bead retention flange being formed on said second rim part adjacent one of the bead seats and a second attachment flange being formed on said second rim part adjacent the other bead seat, the profile of said other bead seat, when viewed in axial cross-section, being substantially parallel to the axis of the rim, said profile merging into a ramp portion which is engageable by the toe of the bead of a tire mounted thereon to seal the tire/rim cavity.

The angular relationship between the profile of the bead seat and the rim axis is normally referred to as the "taper". The term "taper" in relation to bead seats on a rim and bead seating surface on a tire is used in this specification to denote the angle which, in axial cross-sectional profile, such bead seat or bead seating surface makes with the axis of the rim or tire respectively. A "positive" taper is one in which (as in most conventional rim and tire designs) the diameter of the surface is greater in the region remote from the mid-circumferential plane of the rim or tire than in the region nearer to the mid-circumferential plane, and a "negative" taper is one in which the diameter of the surface is greater in the region nearer to the mid-circumferential plane of the rim or tire than in the region remote from the mid-circumferential plane. A zero taper is one in which the bead seating surface profile is parallel to the axis of the tire or rim.

The "ramp portion" referred to above is a portion of the axial cross-sectional profile of the rim, of increasing diameter towards the mid-circumferential plane of the rim, which lies at the axially inner side of the bead seat relative to the mid-circumferential plane of the rim. In a preferred construction, the ramp portion which considered in axial cross-section may make an angle of, say 40° with the rim axis, to a sufficient radial height relative to the rim axis to ensure that the associated tire bead cannot be displaced axially inwardly from its seat, since the bead contains an inextensible reinforcement wire.

Normally, the portion of the bead seat profile leading to the ramp portion has zero taper, that is, it is flat in axial cross-section, parallel to the axis of the ring for a reason which will be explained later in the specification, but may have a slight inclination to the axial direction provided that such inclination can be accommodated by the deformability of the corresponding bead seating portion of the tire bead when fitting the tire to the rim.

The "other bead seat" and ramp portion defined above are normally on the outboard side of the rim that is, on the axially outer side of the rim when fitted in its usual position on a vehicle.

The rim construction in accordance with the invention may incorporate a shallow well in order to permit assembly of the inboard tire bead to the rim, or a rim of stepped diameter may be provided, the outboard bead seat being of smaller diameter than the inboard bead seat.

The invention also provides a pneumatic tire and rim assembly and a pneumatic tire and wheel assembly incorporating a rim as defined above.

The invention further provides a tubeless pneumatic tire which comprises a tread, sidewalls and a pair of beads having radially inner seating surfaces for engagement with an associated wheel rim, at least one of said seating surfaces having substantially no taper.

The toe of each bead having a seating surface of substantially no taper may be coated with soft rubber. The term "soft rubber" is intended to cover rubber having a hardness number within the range 55 to 60 British Standard Degrees or Shore A.

Figure 2:
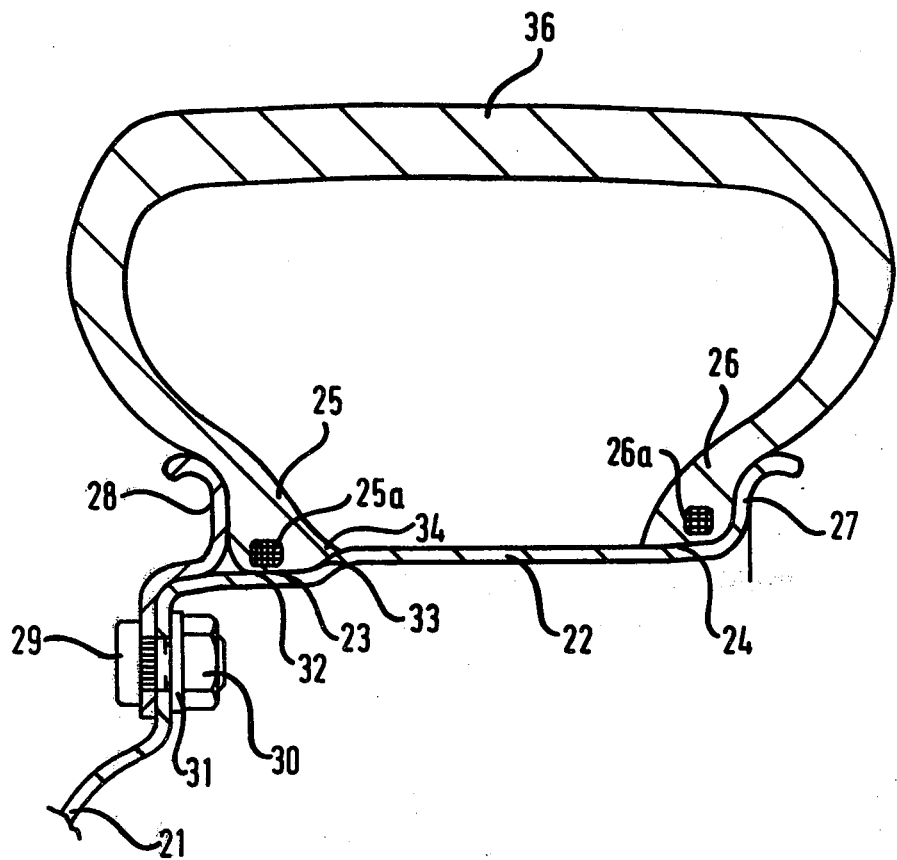

Two embodiments of the invention will now be described, by way of example, with reference to the accompanying drawings in which:

FIG. 1 is an axial cross-sectional view of part of a pneumatic tire and rim assembly in accordance with the invention, and FIG. 2 is an axial cross-sectional view of part of an alternative pneumatic tire and rim assembly in accordance with the invention.

As shown in FIG. 1 a pressed-steel wheel body 1 is formed integrally with an inboard rim portion 2 which provides annular bead seats 3 and 4 respectively for the beads 5 and 6 of a tubeless pneumatic tire 17 which incorporate the usual inextensible bead wires 5a, 6a. A bead-retaining flange 7 is integral with the inboard rim part, and a detachable bead-retaining flange 8 is secured to the outboard side of the wheel body by studs 9 and nuts 10 which engage washers 11 on the inboard side of the wheel body.

The bead seat 4 is of conventional profile, having the usual 5° taper, which mates with a corresponding taper on the tire bead 6, but the bead seat 3 has a profile which in the axially outer region 12 is flat and parallel to the wheel axis and in the inner region leads to a ramp 13 against which the toe 14 of the tire bead 5 is forced by pressure from the outboard flange 8. The tire bead 5, instead of having a taper is moulded with a flat seating profile parallel to the tire axis when mounted on the rim, and this enables the bead 5 to pass easily over the bead seat region 12 until the toe 14 contacts the ramp 13. The bead toe 14 is caused, by the axial pressure from the flange 8 generated by the tightening of the nuts 10, to ride up the ramp 13 and this creates air-tight sealing engagement between the ramp portion of the rim and the soft rubber-covered bead toe portion 14.

In order to permit the bead 6 to be assembled on to the rim in the conventional manner utilizing a well-base rim, the inboard rim portion 2 is formed with a shallow well 15 which is separated from the ramp 13 by a radially outwardly extending hump 16. The hump 16 projects radially to a sufficient extent to prevent displacement of the outboard tyre bead 5 from its seat.

In the construction illustrated in FIG. 2, a wheel body (disc) 21 is integral with an inboard rim portion 22 which provides bead seats 23 and 24 respectively for the beads 25 and 26 of a tubeless pneumatic tire 36 which incorporates bead wires 25a, 26a. A bead-retaining flange 27 is integral with the inboard rim part, and a detachable bead retaining flange 28 is secured to the outboard side of the wheel body by studs 29 and nuts 30 which engage washers 31 on the inboard side of the wheel body.

The bead seat 24 and tire bead 26 are of conventional tapered profile, the bead seat having the usual 5° taper, but the bead seat 23 is of smaller diameter than the bead seat 24 and its axial cross-sectional profile in the axially outer region 32 is flat and parallel to the wheel axis. A similar flat profile is provided on the tire bead 25, which is, of course, smaller in diameter than the bead 26. The axially inner region 33 of the bead seat 24 forms a ramp 33 against which the soft rubber-covered toe 34 of the tire bead 25 is forced by pressure from the outboard flange 28 to effect an air-tight seal as described with reference to FIG. 1.

Since the outboard tire bead 25 as illustrated in FIG. 2 is of smaller diameter than that of the inboard bead seat and central portion of the rim 24, no hump needs to be provided to retain the outboard bead, and it is therefore possible to fit the tire simply by sliding first the inboard bead and then the outboard bead axially on to their respective seats.

In both of the examples described above, sealing of the tire/rim cavity is achieved without the use of separate sealing rings for the joint between the two rim portions, and this provides a simplification in assembly and a useful cost reduction. The seal is created as the bead toe is driven up the ramp by the tightening of the securing nuts and studs for the outboard flange, and does not require a particularly accurate relationship between the components involved since provided that the bead toe is seated on the ramp, its exact position on the ramp is not critical. The firm engagement between the bead toe and the ramp also provides adequate grip to transmit acceleration and braking forces between the tire and the rim.

A tire and wheel assembly of the kind described above is particularly suitable for applications in which the tire is required to be capable of use in a deflated state, and for this purpose it is desirable to include means for releasing lubricant into the tire cavity upon deflation to prevent excessive heat build-up.

In the examples described above, the outboard bead of the tire is provided with a profile which, in the unstressed state of the bead, is flat and parallel to the tire axis. While in theory a normal tapered outboard bead and correspondingly tapered outboard seat could be used, in practice a bead of this kind could not be fitted on the inboard rim portion unless the angle of taper was very small: there is the alternative of providing a negative taper on the outboard bead (i.e. the toe of the bead would have a greater diameter than the heel) but the moulding of a tire bead to this profile would present considerable difficulties since it would entail the design of special mould components to enable the bead to be released after moulding.

While in the embodiments described above, the outboard rim flange is detachable, in an alternative construction the outboard flange is integral with the wheel body and the inboard flange and rim base portion is detachably secured thereto.

Having described my invention, what I claim is:
1. A tire and split rim assembly comprising:
   a tubeless pneumatic tire comprising;
   a tread,
   sidewalls,
   a first bead having a first toe and a first radially inner seating surface of no taper, and
   a second bead having a second toe and a second radially inner seating surface,
   a split rim assembly comprising:
   a first rim part which comprises a first bead retention flange and a first attachment flange, and
   a second rim part comprising:
   a first bead seat, parallel to the axis of the rim assembly, on which the first radially inner seating surface of the first bead is positioned, said first bead seat having an axial width less than that of the first radially inner surface of the first bead,
   a second bead seat on which the second radially inner seating surface of the second bead is positioned,
   a second bead retention flange adjacent said second bead seat, and
   a second attachment flange adjacent said first bead seat, and
   said first bead seat merges into an axially inwardly and radially outwardly extending ramp portion on which the first toe of the first bead is positioned and maintained by the first bead retention flange to seal the tire and rim assembly, said ramp portion being of sufficient radial height above the first bead seat to block axially inward movement of said first bead beyond said ramp portion.

2. A tire and split run assembly according to claim 1 wherein the axially outer portion of the first bead seat merges into the second attachment flange.

3. A tire and split rim assembly according to claim 1 wherein the ramp portion makes an angle of approximately 40° with the rim assembly axis and extends radially outwardly to a sufficient radial height relative to the rim assembly axis to ensure that the first tire bead cannot be displaced axially inwardly from the first seat.

4. A tire and split rim assembly according to claim 3 wherein a substantially flat profile rim base extends between the bead seats.

5. A tire and split rim assembly according to claim 3 wherein the rim is provided with a base portion having a shallow radially inwardly extending well portion to enable the second bead tire to be fitted to second bead seat.

6. A tire and split rim assembly according to claim 5 wherein the mean diameters of the first and second bead seats are equal.

7. A tire and split rim assembly according to claim 4 wherein the diameter of the first bead seat is less than the diameter of the second bead seat.

8. A tire and wheel assembly comprising a tire and split rim assembly as claimed in claim 1 wherein the attachment flange of the first rim part is formed integrally with a disc portion of the wheel.

9. A tire and wheel assembly comprising a tire and split rim assembly as claimed in claim 1 wherein the attachment flange of the second rim part is formed integrally with a disc portion of the wheel.

* * * * *